United States Patent

Peters et al.

Patent Number: 5,841,487
Date of Patent: Nov. 24, 1998

[54] CIRCUIT ARRANGEMENT FOR CONTROLLING A PICTURE DISPLAY TUBE

[75] Inventors: Matthias Peters, Neu Wulmsdorf; Christian Brun, Lüneburg, both of Germany

[73] Assignee: U.S. Philips Corporation, New York, N.Y.

[21] Appl. No.: 640,974

[22] PCT Filed: Aug. 30, 1995

[86] PCT No.: PCT/IB95/00717

§ 371 Date: May 13, 1996

§ 102(e) Date: May 13, 1996

[87] PCT Pub. No.: WO96/08920

PCT Pub. Date: Mar. 21, 1996

[30] Foreign Application Priority Data

Sep. 15, 1994 [DE] Germany ............... 44 32 844.3

[51] Int. Cl.$^6$ ............... H04N 5/202; H04N 5/20; H04N 9/69
[52] U.S. Cl. ............... 348/674; 348/805
[58] Field of Search ............... 348/674, 675, 348/676, 677, 805, 806; 358/32, 164; 315/30, 383; H04N 5/202, 5/20, 9/69

[56] References Cited

U.S. PATENT DOCUMENTS

| | | | |
|---|---|---|---|
| 4,547,797 | 10/1985 | Mick | 348/675 |
| 4,672,452 | 6/1987 | Corbel et al. | 358/187 |
| 5,103,145 | 4/1992 | Doran | 315/381 |
| 5,335,068 | 8/1994 | Hanajima | 348/674 |
| 5,410,223 | 4/1995 | Van Amesfoort | 315/383 |

*Primary Examiner*—Tommy P. Chin
*Assistant Examiner*—Nhon T. Diep
*Attorney, Agent, or Firm*—Edward W. Goodman

[57] ABSTRACT

In a circuit arrangement for direct current control of a picture display tube having a non-linear voltage/current characteristic by a precorrected picture signal, the picture signal is applied to a non-linear compensation circuit (3) which cancels the precorrection of the picture signal and controls a controlled current source (8) at the output end, whose output is coupled to the cathode (10) of the picture display tube (1), and a differentiator (13) is provided which differentiates the picture signal and controls a voltage-controlled compensation current source (12) which is coupled to the cathode (10) of the picture display tube (1) for a picture signal-dependent reversal of the charge of the parasitic input capacitance (11) of this picture display tube.

5 Claims, 1 Drawing Sheet

CIRCUIT ARRANGEMENT FOR CONTROLLING A PICTURE DISPLAY TUBE

BACKGROUND OF THE INVENTION

Field of the Invention

The invention relates to a circuit arrangement for controlling a picture display tube having a non-linear voltage/current characteristic by means of a picture signal which is precorrected or linear for compensating the non-linear characteristic of the picture display tube.

The known prior-art circuit arrangements for controlling picture display tubes employ a voltage control, i.e., the beam current of the picture display tube is generated by a voltage between cathode and grid 1 of the picture display tube. For this reason, a precorrection of the signal is necessary because the beam current, and hence the luminance, is non-linearly related to the control voltage. The main drawback of these circuit arrangements is that they must operate in a voltage range of approximately 100 V at the cathode with a bandwidth of, for example, 8 MHz for a 50 Hz receiver with a 4:3 format. For a 100 Hz television receiver, a bandwidth of 16 MHz is required and a further increase of the bandwidth is required for apparatuses having a 16:9 aspect ratio. Voltage control of picture display tubes involves the further drawback that the output voltage range to be used for the RGB processor must be large. This renders these control circuits very elaborate. A further drawback of these circuits is that, for reasons of the non-linear relationship between beam current and control voltage, they cannot present linear RGB signals without correction, which signals are supplied, for example, by a computer, a D/A converter or are suitable for displaying a menu generated in the television receiver.

SUMMARY OF THE INVENTION

It is an object of the invention to provide a circuit arrangement having a simple structure for controlling picture display tubes, which can process picture signals with a large bandwidth.

For a first embodiment of the invention, this object is solved in that the picture signal is applied to a non-linear compensation circuit which cancels the precorrection of the picture signal and controls a controlled current source at the output end, the output of said current source being coupled to the cathode of the picture display tube, and in that a differentiator is provided which differentiates the picture signal and controls a voltage-controlled compensation current source which is coupled to the cathode of the picture display tube for a picture signal-dependent reversal of the charge of the parasitic input capacitance of said picture display tube.

As already stated in the opening paragraph, the television signals nowadays transmitted by television stations are generally non-linearly precorrected. This precorrection is carried out in such a way that it just compensates the non-linear proportion between the applied voltage and the beam current upon a voltage control of the picture display tube, so that a linear behavior of the luminance results when the picture is displayed on the picture display tube.

For picture signals which are precorrected in this way, the precorrection is cancelled by means of a non-linear compensation circuit in the circuit arrangement according to the invention which employs a current control of the picture display tube. The non-linear characteristic curve of this compensation circuit is then exactly opposite to that of the precorrection performed at the transmitter end. A linear picture signal is then again present at the output of this compensation circuit. By means of this linear picture signal, a controlled current source is controlled which couples a corresponding current to the cathode of the picture display tube at the output end in dependence upon this signal (linear dependence). Since a current is directly supplied in this case, the luminance is also linear because the luminance is directly dependent on the current in a linear way.

However, it should be noted that the picture display tube has a parasitic input capacitance which may be produced by the picture display tube itself, but possibly also by external circuit connections between the picture display tube and the circuit arrangement according to the invention. At every change of the luminance, this capacitance must be reversed in charge. To this end, a voltage-controlled compensation current source is provided whose input receives the picture signal differentiated by means of a differentiator. At the output end, this compensation current source supplies charge and discharge currents for the parasitic input capacitance of the picture display tube, realizing a rapid reversal of the charge of this capacitance in dependence upon the picture signal.

The main advantage of the circuit arrangement according to the invention is that it is particularly suited to comply with the requirements imposed on the bandwidth of such circuit arrangements. It is also particularly suitable for television receivers having a 16:9 aspect ratio, even when they operate at a 100 Hz field frequency and a possibly even higher number of picture lines, and hence a higher horizontal frequency. The circuit arrangement has a simple structure and ensures a very precise linear luminance variation of the picture displayed due to the exactly imitable electronic cancellation of the precorrection of the picture signal by means of the non-linear compensation circuit. A further advantage is that the cut-off point control for the picture display tube, which is performed by means of measuring lines supplied in the vertical blanking intervals, is no longer necessary. This advantage is particularly important for switching the format from an aspect ratio of 4:3 to 16:9 in a 4:3 picture display tube, because these measuring lines then become visible in such picture display tubes.

For linear picture signals, i.e., picture signals which are not precorrected, a second embodiment of the invention is characterized in that the picture signal is applied to a controlled current source which is coupled to the cathode of the picture display tube at the output end, and in that the picture signal is applied to a non-linear precorrection circuit which precorrects the picture signal having a non-linear characteristic and compensates the non-linearity of the picture display tube, and whose output signal is applied to a differentiator which controls a controlled compensation current source which is coupled at the output end to the cathode of the picture display tube for a picture signal-dependent reversal of the charge of the parasitic input capacitance of said picture display tube.

With a picture signal which is not precorrected, i.e., a signal which is linearly dependent between voltage and luminance, this picture signal, in the circuit arrangement according to the invention employing a current control of the picture display tube, can be used in this linear form for controlling a current source which, at the output end, impresses a current dependent on the picture signal on the cathode of the display tube. This also ensures a linear behavior when the picture display tube is controlled, because the luminance is directly and linearly dependent on the cathode current in the display by the display tube.

Here again, a reversal of the charge of the parasitic input capacitance of the picture display tube in dependence upon the picture signal is necessary. Due to the non-linear voltage/current characteristic of the picture display tube, a dependence of this reversal of the charge on a non-linear picture signal in accordance with the non-linear characteristic of the picture display tube is, however, necessary in this case. Therefore, the picture signal is applied to a non-linear precorrection circuit which performs such a precorrection of the picture signal that it would just compensate the non-linearity of the picture display tube. However, this signal is not employed for direct control of the picture display tube by means of the picture signal, but is used for the picture signal-dependent reversal of the charge in accordance with the non-linear characteristic of the picture display tube. To this end, the output signal of this precorrection circuit is applied to a differentiator which controls a controlled compensation current source whose output is connected to the cathode of the picture display tube. The output signal, which is supplied by this compensation current source, is exclusively used for the purpose of reversing the charge of the parasitic input capacitance of the picture display tube in dependence upon the picture signal, so that luminance jumps, requiring a correspondingly rapid reversal of the charge of this input capacitance, can actually be displayed in an undistorted form on the picture display tube. The required currents for reversing the charge of the input capacitance are supplied by this compensation current source.

The advantages of the circuit arrangement in accordance with the second embodiment essentially coincide with those of the circuit arrangement in accordance with the first embodiment. A linear picture signal may be directly utilized for controlling a controlled current source which in its turn impresses a picture signal-dependent current on the cathode of the picture display tube. This ensures an undistorted display of the linear picture signal.

The first embodiment in accordance with the invention is characterized in that the compensation circuit has a stage with a non-linear characteristic, which generates an output signal y from an input signal x in accordance with the equation $$y=x^\gamma$$

in which $\gamma$ represents the non-linearity of the voltage/current characteristic of the picture display tube in accordance with the equation $$U_k=U_{sperr}-(K_1 \cdot I_{STR})^{1/\gamma}$$

The non-linearity is generally referred to as gamma. To cancel this dependence, the compensation circuit operates with a non-linear characteristic in accordance with the equation $$y=x^\gamma,$$

so that the non-linearity impressed on the picture signal for compensating the voltage/current characteristic of the picture display tube is cancelled.

The reverse is required for the precorrection circuit of the circuit arrangement in accordance with the second embodiment of the invention, in which a precorrection, as generally performed at the transmitter end, is required for the picture signal-dependent generation of a compensation current for reversing the charge of the parasitic input capacitance of the picture display tube. For this case, a further embodiment of the invention is characterized in that the precorrection circuit has a stage with a non-linear characteristic, which generates an output signal y from an input signal x in accordance with the equation $$y=x^{1/\gamma}$$

in which $\gamma$ represents the non-linearity of the voltage/current characteristic of the picture display tube in accordance with the equation $$U_k=U_{sperr}-(K_1 \cdot I_{STR})^{1/\gamma}$$

In both embodiments, an ideal behavior is assumed for the compensation current source, i.e., this current source should be capable of supplying currents of both polarities. It should thus be capable of both charging and discharging the parasitic input capacitance of the picture display tube. Since real current sources do not have this ideal behavior, the compensation current source, initially assumed to be ideal, may be composed of, for example, two current sources both of which operate at the output end on the cathode of the picture display tube. One of the current sources operates against a positive potential and the other operates against a negative potential or reference potential. At least one of the two current sources should then be controllable in dependence upon the output signal of the differentiator. If there is no change of the picture signal contents, the two current sources supply the same current so that the charge of the input capacitance of the picture display tube is not changed. When the picture contents change, however, one current source supplies a larger or a smaller current than the other so that the currents from the current sources do not cancel each other and a part of the current flows through the capacitance so that this capacitance is subjected to a charge reversal in the desired manner.

These and other aspects of the invention will be apparent from and elucidated with reference to the embodiments described hereinafter.

DESCRIPTION OF THE PREFERRED EMBODIMENTS

Figure 1:
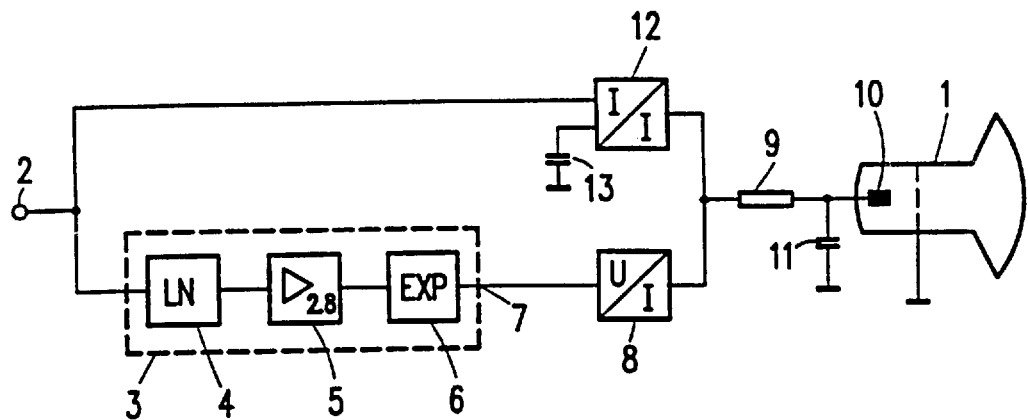
FIG. 1 is a block diagram of a circuit arrangement in accordance with the first embodiment of the invention.

Before elucidating the three embodiments of the invention as shown in the three Figures, a theoretical calculation hereinafter will show which properties the circuit arrangement according to the invention should have, particularly with a view to the non-linear voltage/current characteristic of the picture display tube. The input terminal, i.e. the cathode of the picture display tube, has a parasitic capacitance $C_{par}$. For an arbitrary time function for a beam current $i_0(t)$, the following relation results for the current:

$$iC_{par}(t) = C_{par} \cdot \frac{du_K(t)}{dt} \qquad (1)$$

in which $u_K(t)$ is the cathode voltage of the picture display tube.

The following formula can be derived from the characteristic curve of a picture display tube:

$$I_{STR} = \frac{(U_{sperr} - U_{Kat})^\gamma}{K_I},$$

in which $U_{sperr}$ is the cut-off voltage of the cathode, and $K_1$ is a constant factor which is dependent on the characteristic curve of the picture display tube. The following can be gained from this equation for the cathode voltage $U_{kath}$:

$$U_{kath} = U_{sperr} - (K_1 \cdot I_{STR})^{1/\gamma}$$

Here, $\gamma$ is generally indicated as a characteristic for this non-linearity. The following dependence for the cathode voltage is then obtained:

$$u_k(t) = f(i_0[t]) = U_{blk} - (K_1 \cdot i_0[t])^{1/\gamma}, \qquad (2)$$

in which $U_{blk}$ is the cathode cut-off voltage, $i_0[t]$ the time function of the beam current $K_1$ is a constant factor which depends on the characteristic curve of the picture display tube.

If the equation (2) is differentiated as a function of time, the result is:

$$\frac{du_K(t)}{dt} = -\frac{1}{\gamma} \cdot K_1^{\frac{1}{\gamma}} \cdot i_0(t)^{(\frac{1}{\gamma} - 1)} \cdot \frac{di_0(t)}{dt}. \qquad (3)$$

Use of this relation in equation (1) finally results in:

$$ic_{par}(t) = -C_{par} \cdot \frac{1}{\gamma} \cdot K_1^{\frac{1}{\gamma}} \cdot i_0(t)^{(\frac{1}{\gamma} - 1)} \cdot \frac{di_0(t)}{dt} \qquad (4)$$

This current should be generated to compensate the influences of the parasitic input capacitance of the picture display tube so that a direct control of the beam current can also be performed for high frequencies.

To be able to supply this current for reversal of the charge of the parasitic input capacitance of the picture display tube, the circuit arrangement, according to the invention, should supply a compensation current $i_{komp}(t)$:

$$i_{Komp}(t) = K_2 \cdot C_{Komp} \cdot \frac{1}{\gamma} \cdot u_1(t)^{(\frac{1}{\gamma} - 1)} \cdot \frac{du_1(t)}{dt}. \qquad (5)$$

This equation shows that fundamentally, one stage with a non-linear characteristic $y=x^{1/\gamma}$, a differentiator with a capacitance $C_{komp}$ as well as an amplifier with a gain factor $K_2$ are required. These elements will be described hereinafter with reference to the circuit arrangements shown in FIGS. 1 to 3.

FIG. 1 is a block diagram of a circuit arrangement in accordance with the first embodiment of the invention. The Figure shows, diagrammatically, a picture display tube 1 on which a picture signal applied to the input of the circuit arrangement 2 is to be displayed. In the exemplary case, in accordance with FIG. 1, it is assumed that this is a picture signal which is precorrected for compensating the non-linear voltage/current characteristic of the picture display tube. This is the case for practically all television signals transmitted by transmission stations.

Since the picture signal is precorrected, and the circuit arrangement according to the invention performs a current control of the picture display tube in which the cathode current linearly results in a corresponding luminance, the precorrection of the picture signal must be cancelled. To this end, a compensation circuit 3 cancelling this precorrection of the picture signal is provided in the circuit arrangement of FIG. 1.

It was explained hereinbefore that a stage with a non-linear characteristic in conformity with $y=x^\gamma$ is required for this purpose. Since it holds that:

$$x^\gamma = e^{(\gamma \cdot \ln x)}$$

this non-linearity can be realized in accordance with the block diagram of the compensation circuit 3 in FIG. 1 by logarithmation of the input signal by means of a logarithmator 4, a subsequent amplifier 5 and a circuit arrangement 6 for forming the exponential function. By means of the elements 4 to 6, the non-linearity of the picture signal can then be cancelled so that the compensation circuit 3 supplies a linear picture signal at its output 7, which signal is applied to a controlled current source, also operating linearly, which current source impresses this signal on a cathode 10 of the picture display tube at the output end via a protecting resistor 9. The linearized picture signal is thus impressed on this cathode, which signal results in a corresponding linear luminance variation in the display of the picture because the displayed luminance linearly depends on the beam current which is impressed on the cathode 10.

However, the picture display tube 1 has a parasitic input capacitance which is symbolically shown by an externally arranged capacitance 11 in FIG. 1. At each change of the picture contents, thus at each change of the picture tube current impressed on the cathode 10, this input capacitance must be reversed in charge, accordingly. Upon rapid changes of the picture contents, very rapid and possibly strong current variations are required which are slowed down by the necessary reversal of the charge of the capacitance 11. This influence of the parasitic input capacitance 11 is compensated in that a controlled compensation current source 12 is provided whose input receives the picture signal 2 which, in accordance with the diagrammatical representation in FIG. 1, is differentiated by means of a capacitance 13. Dependent on this differentiated picture signal, the compensation current source 12 impresses a compensation current on the cathode 10 of the picture display tube 1 via the protecting resistor 9, which compensation current reverses the charge of the parasitic input capacitance 11. This current is directly dependent on the picture contents so that, by dimensioning the capacitance 13 and the compensation current source 12, this current can be chosen to be such that it just represents the required charge reversal current for the capacitance 11. The current supplied by the current source 8 is then impressed on the cathode 10 of the picture display tube 1 in an undistorted form, without the parasitic input capacitance 11 becoming noticeable.

In spite of its simple structure, this circuit arrangement has a large bandwidth and allows direct current control of the cathode 10 of the picture display tube 1.

Figure 2:
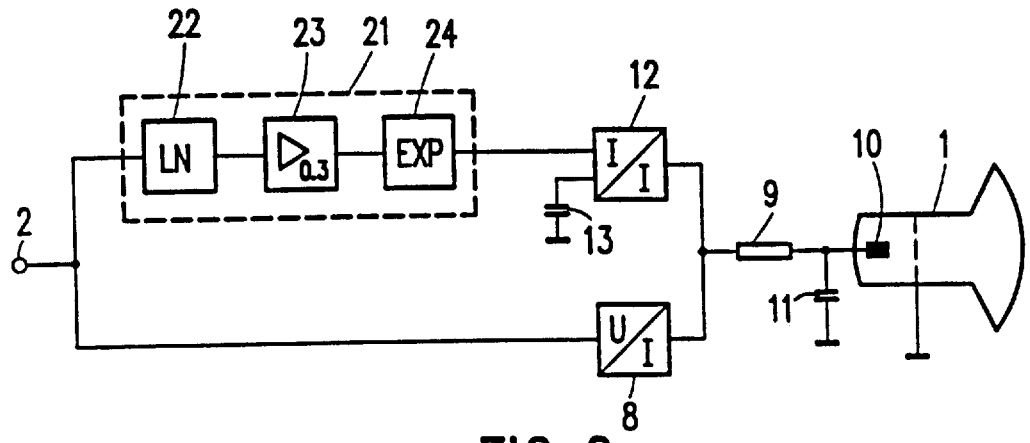
FIG. 2 is a block diagram of a circuit arrangement in accordance with the second embodiment of the invention.

FIG. 2 is a block diagram of a circuit arrangement in accordance with the second embodiment of the invention, in which components denoted by the same reference numerals as in the circuit arrangement of FIG. 1 have the same function.

For the representation in accordance with FIG. 2, it is assumed that the input 2 of the circuit arrangement receives a picture signal with a linear characteristic curve, as supplied, for example, by computers, text generators or also D/A converters. This linear picture signal may be directly used for controlling the controlled current source 8, because no non-linearities need to be cancelled in this case. The current supplied by the controlled current source 8 is applied via the protecting resistor 9 to the cathode 10 and generates a picture with a linear luminance variation.

Also in the embodiment of FIG. 2, the parasitic input capacitance 11 of the picture display tube is to be reversed in charge, dependent on the picture contents. To this end, a precorrection circuit 21 is provided for generating the function $y=e^{(1/\gamma \cdot lnx)}$ and comprises a logarithmator 22, an amplifier 23 and a circuit 24 for generating the exponential function. This precorrection circuit 21 precorrects the initially linear picture signal in such a way that it compensates the non-linearity of the voltage/current characteristic of the picture display tube 1, and the circuit arrangement 21 thus supplies a picture signal at the output end with a precorrection as is generally represented by picture signals supplied by transmitter stations. This picture signal is differentiated in the same way as in FIG. 1 and also impressed on the input of the picture display tube 1 via a controlled compensation current source. This additionally impressed current is used for the purpose of reversing the charge of the parasitic input capacitance 11 dependent on the picture contents, so that the current supplied by the current source 8 directly generates the cathode current of the picture display tube 1 without interference.

Figure 3:
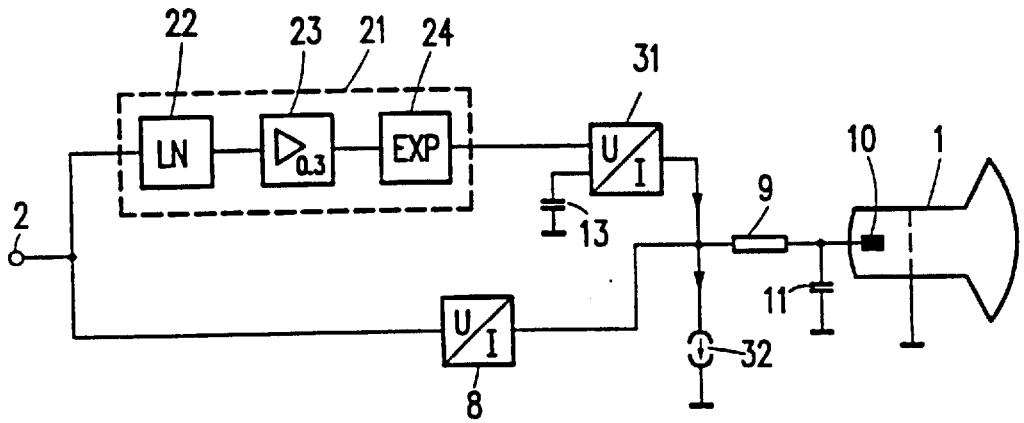
FIG. 3 is a block diagram, corresponding to that shown in FIG. 2, in which the compensation current source assumed to be ideal is realized by means of two current sources.

FIG. 3 shows a modification of the circuit arrangement of FIG. 2, in which the initial voltage-controlled current source 12 is replaced by two current sources 31 and 32.

In the circuit arrangement of FIG. 2, the controlled current source 12 should be able to supply currents of both polarities for reversing the charge of the capacitance 11. This is a problem in practical realizations. In the circuit arrangement of FIG. 3, this current source 12 of the circuit arrangement of FIG. 2, initially assumed to be ideal, is therefore replaced by two current sources 31 and 32 which must supply exclusively currents of one polarity and are thus easier to realize.

The current source 32 supplies a constant current while the current source 31 is controllable in dependence upon the picture signal impressed with a non-linear characteristic.

The current sources 31 and 32 are dimensioned in such a way that both of them supply the same current whenever there is no change of the picture contents, so that this current from the current source 31 flows off to the reference potential via the current source 32 and no current flows into the picture display tube or its parasitic input capacitance 11. However, when the picture contents change, the current source 31 supplies a changing current, whereas the current source 32 further supplies the constant current. The current sum of both current sources is then no longer equal so that a difference current flows to or from the parasitic input capacitance 11. This current is used for reversing the charge of this input capacitance, dependent on the picture signal.

We claim:

1. A circuit arrangement for controlling a picture display tube having a non-linear voltage/current characteristic by means of a picture signal which is precorrected for compensating the non-linear characteristic of the picture display tube, characterized in that the circuit arrangement comprises:

a non-linear compensation circuit having an input for receiving the picture signal, said non-linear compensation circuit cancelling the precorrection of the picture signal;

a controlled current source having an input coupled to an output of said non-linear compensation circuit, an output of said current source being coupled to a cathode of the picture display tube;

a differentiator for differentiating the picture signal; and a voltage-controlled compensation current source having an input for receiving the picture signal, a control input coupled to said differentiator enabling said differentiator to differentiate the picture signal, and an output also coupled to the cathode of the picture display tube for a picture signal-dependent reversal of a charge of a parasitic input capacitance of said picture display tube.

2. A circuit arrangement as claimed in claim 1, characterized in that the compensation circuit comprises a stage with a non-linear characteristic, which generates an output signal y from an input signal x in accordance with the equation $$y=x^\gamma$$

in which $\gamma$ represents the non-linearity of the voltage/current characteristic of the picture display tube in accordance with the equation $$U_k=U_{sperr}-(K_1 \cdot I_{STR})^{1/\gamma}$$

in which $U_{sperr}$ represents a cut-off voltage of the picture display tube, and $K_1$ represents a constant factor dependent on the picture display tube.

3. A circuit arrangement as claimed in claim 1, characterized in that the compensation current source comprises two current sources both of which operate on the cathode of the picture display tube, one of said two current sources operating against a positive reference potential and the other of said two current sources operating against a negative reference potential, at least one of the two current sources being controllable by the output signal of the differentiator.

4. A picture display device including a picture display tube having a non-linear voltage/current characteristic, and a circuit arrangement for controlling the picture display tube by means of a picture signal which is precorrected for compensating the non-linear characteristic of the picture display tube, characterized in that the circuit arrangement comprises:

a non-linear compensation circuit having an input for receiving the picture signal, said non-linear compensation circuit cancelling the precorrection of the picture signal;

a controlled current source having an input coupled to an output of said non-linear compensation circuit, an output of said current source being coupled to a cathode of the picture display tube;

a differentiator for differentiating the picture signal; and a voltage-controlled compensation current source having an input for receiving the picture signal, a control input coupled to said differentiator enabling said differentiator to differentiate the picture signal, and an output also coupled to the cathode of the picture display tube for a picture signal-dependent reversal of a charge of a parasitic input capacitance of said picture display tube.

5. A method of controlling a picture display tube having a non-linear voltage/current characteristic by means of a picture signal which is precorrected for compensating the non-linear characteristic of the picture display tube, characterized in that said method comprises the steps:

cancelling the precorrection of the picture signal;

generating a current for application to the cathode of the picture display tube, said current being dependent on said picture signal which is no longer precorrected;

differentiating the precorrected picture signal; and generating a compensation current for application to the cathode of the picture display device, said current being dependent on said differentiated precorrected picture signal, said compensation current compensating for a picture signal-dependent reversal of the charge of the parasitic input capacitance of said picture display tube.

* * * * *